United States Patent [19]

Müller et al.

[11] Patent Number: 5,288,300
[45] Date of Patent: Feb. 22, 1994

[54] FILTER WITH A FILTER CASSETTE

[75] Inventors: Theodor Müller, Eichenzell; Peter Hartung, Eichenzell-Rothemann, both of Fed. Rep. of Germany

[73] Assignee: Thermoplast-Technik Gesellschaft fur Kunststoffverarbeitung m.b.H., Fed. Rep. of Germany

[21] Appl. No.: 953,213

[22] Filed: Sep. 30, 1992

[30] Foreign Application Priority Data

Oct. 7, 1991 [DE] Fed. Rep. of Germany ....... 4133175

[51] Int. Cl.⁵ .................................................. B01D 27/08
[52] U.S. Cl. .................................................. 55/497
[58] Field of Search .................................. 55/497

[56] References Cited

U.S. PATENT DOCUMENTS

| | | | |
|---|---|---|---|
| 3,360,120 | 12/1967 | Getzin | 55/497 |
| 3,778,985 | 12/1973 | Daigle et al. | 55/497 |
| 3,815,754 | 6/1974 | Rosenberg | 55/497 |
| 4,376,635 | 2/1983 | Mules | 55/497 |
| 4,925,469 | 5/1990 | Clement et al. | 55/497 |
| 4,961,762 | 10/1990 | Howeth | 55/497 |

FOREIGN PATENT DOCUMENTS

| | | | |
|---|---|---|---|
| 0334719 | 9/1989 | European Pat. Off. | 55/497 |
| 1776236 | 10/1974 | Fed. Rep. of Germany | 55/497 |
| 3150392 | 6/1983 | Fed. Rep. of Germany | |
| 3439255 | 3/1988 | Fed. Rep. of Germany | |
| 3936858 | 5/1991 | Fed. Rep. of Germany | |
| 4002078 | 5/1991 | Fed. Rep. of Germany | |
| 2179872 | 3/1987 | United Kingdom | 55/497 |

*Primary Examiner*—Tim Miles
*Attorney, Agent, or Firm*—Wegner, Cantor, Mueller & Player

[57] ABSTRACT

A filter cassette having a fanfolded filter medium against which a thin walled strip is cemented on each fanfolded face by means of an edge gluing machine such that on the upstream side it projects slightly over the filter medium. To hold the filter cassette in the filter housing there is a clamping frame, which reaches over the edge of the filter cassette and forces the protruding, upstream side face of the outer strip into a seal of the filter housing and whose two opposing sides have a surface prong that reaches into the outermost fanfold of the filter medium and pushes it into another seal of the filter housing.

1 Claim, 3 Drawing Sheets

FILTER WITH A FILTER CASSETTE

BACKGROUND OF THE INVENTION

This invention relates to a filter with a filter cassette, which is disposed in a filter housing and which includes a fanfolded filter medium extending in one plane, with side members formed by thin walled outer strips and cemented against the two staggered faces of the filter medium. Furthermore, the invention relates to a process for manufacturing such a filter and a filter cassette for the filter.

A filter of the above kind is the subject matter of DE-A-31 50 392. In the case of the known filter the outer strips cemented on the filter medium have a peripheral edge, which is oriented flange-like towards the outside, and are cemented like a frame against all four narrow sides of the filter medium. The filter medium provided with these outer strips forms a filter cassette, whose flanged edge rests in the mounted state axially against a seal of a holding frame.

The outer strips represent a solid frame. Therefore, they must be designed so stable that they can carry the filter medium, when its outwardly oriented, flanged edge is clamped into a holding frame. Thus, they cannot be made of the same material as the filter medium. The frame formed by the outer strips must also be disposed of when the filter medium is changed. Another drawback of the known filter cassette is that its mounting in a holding frame and the cementing of the outer strips against the four narrow sides of the filter medium is relatively time consuming.

SUMMARY OF THE INVENTION

This invention is based on the problem of developing a filter, which can be manufactured as inexpensively as possible and leads to a small disposal cost when its filter medium is changed. Furthermore, a process for the manufacture of such a filter and a filter cassette for the filter, which can be carried out as inexpensively as possible, are to be provided.

The former problem is solved according to the invention in that to hold the filter cassette in the filter housing there is a clamping frame, which reaches over the edge of the filter cassette and which forces the protruding, upstream, or clean air sided, face of the outer strip into a seal of the filter housing and whose two opposing sides have a surface prong that reaches into the outermost fanfold of the filter medium and pushes it into another seal of the filter housing.

Such a filter is very inexpensive to manufacture and leads to a small disposal cost when its filter medium is replaced. The interchange can be done rapidly and easily. The seal of the filter medium in the filter housing is realized with minimum expense by means of the two outer strips, protruding in the direction of the seal, and the two surface prongs.

The latter problem is solved by means of the invention in that the filter medium is inserted in such a manner into a holding comb that its staggered face projects slightly at least on one side of the holding comb and that subsequently a thin walled outer strip is cemented by means of an edge gluing machine against the protruding staggered face.

With this procedure edge gluing machines, which are commonly used in the furniture industry, can be used to manufacture filter cassettes. Since the filter medium is held in a holding comb, it can be inserted with this holding comb into an edge gluing machine and there an outer strip can be glued in precisely the same manner as otherwise with the machine a veneer or an outer rod is glued against one edge of a particle board. The process according to the invention is, therefore, inexpensive with machines available in the furniture industry.

Another advantage is that the outer strip has low bulk, so that when interchanging a filter cassette no expensive frame has to be disposed with the filter medium.

The filter medium could be allowed to protrude first to one side in the holding comb, then the one outer strip could be glued on there and finally the filter medium could be moved to the other side in the holding comb, so that then the second outer strip could be cemented on. The manufacture of a filter cassette is, however, less expensive, if, according to another advantageous embodiment of the process of the invention, a holding comb is used that is slightly narrower than the filter medium, so that the filter medium protrudes slightly to both sides in the holding comb.

Deflection and deformation of the filter medium during gluing of the side strips can be ruled out especially reliably, if a second holding comb is inserted into the holding comb following the insertion of the filter medium. This procedure, together with an edge gluing machine used in the furniture industry, allows the manufacture of rectangular filter cassettes, which extend in one plane, with varying lengths, widths, and heights on a machine with few time consuming adjustments.

The latter problem, namely providing a filter cassette for the filter of the invention, which exhibits a fanfolded filter medium, extending in one plane, and side members to hold the filter medium, is solved by means of the invention in that the side members are formed by thin walled outer strips that are cemented against the two staggered faces.

Such a filter cassette is especially inexpensive to manufacture and results in low disposal costs, because it has, in addition to the filter medium, only the thin walled side members. They can exhibit the same plastic as the filter medium, so that there is no consideration of the different materials during disposal.

The filter cassette in the filter housing can be sealed in an especially simple manner, if the outer strips on the upstream or pure air side of the filter medium project slightly over the staggered filter medium.

The invention allows a variety of possible embodiments. To further elucidate its basic principle, reference is made to the drawings in the following.

DESCRIPTION OF THE PREFERRED EMBODIMENTS

Figure 1:
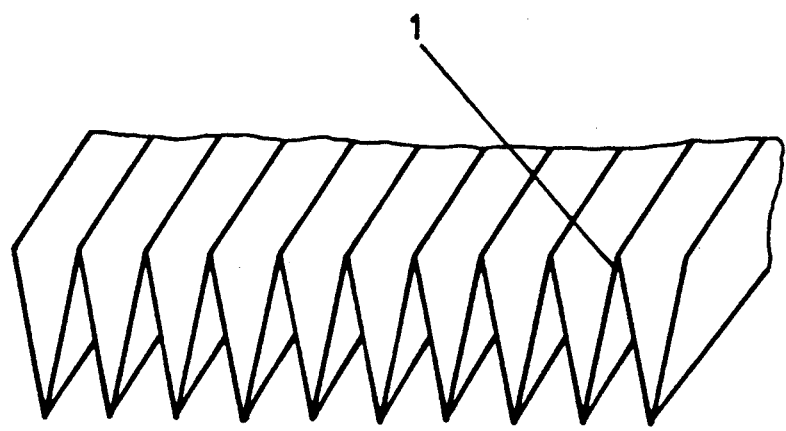
FIG. 1 is a partially fragmentary perspective view of an outer region of a filter medium of the filter cassette of the invention.

FIG. 1 shows an outer region of a filter medium 1, which was generated by fanfolding a flat web of material and comprises an electrostatically charged plastic that does not have a tendency to form bacterial foci.

Figure 2:
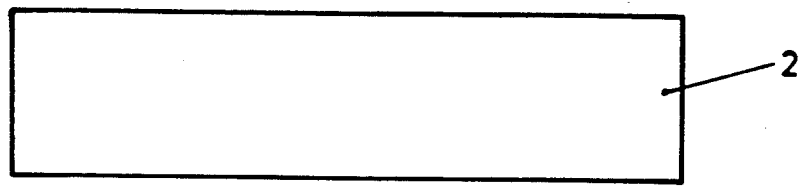
FIG. 2 is a plan view of an outer strip of the filter cassette.
Figure 3:
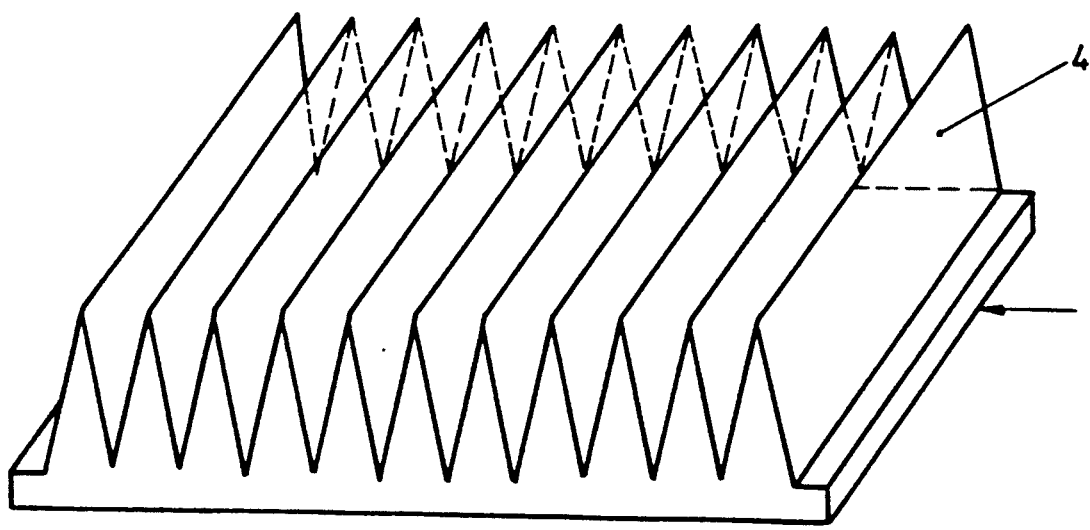
FIG. 3 is a perspective view of a holding comb to be used during the manufacture of the filter cassette.

FIG. 2 shows an outer strip 2 made of a thin walled material. Such outer strips 2 are cemented, according to the invention, against each staggered side of the filter medium 1 with an edge gluing machine. To this end, the fanfolded filter medium is inserted from the top into a holding comb 3, shown in FIG. 3, that the surface prongs 4 of the holding comb 3 reach into the folds of the filter medium 1. For further stabilization, a suitably shaped holding comb can be inserted subsequently from the top into the filter medium 1.

It is important that the holding combs 3 are slightly narrower than the filter medium 1, so that it projects slightly to both sides. In this manner the outer strips 2 can be cemented against the staggered faces of the filter medium in a conventional edge gluing machine of the furniture industry.

Figure 4:
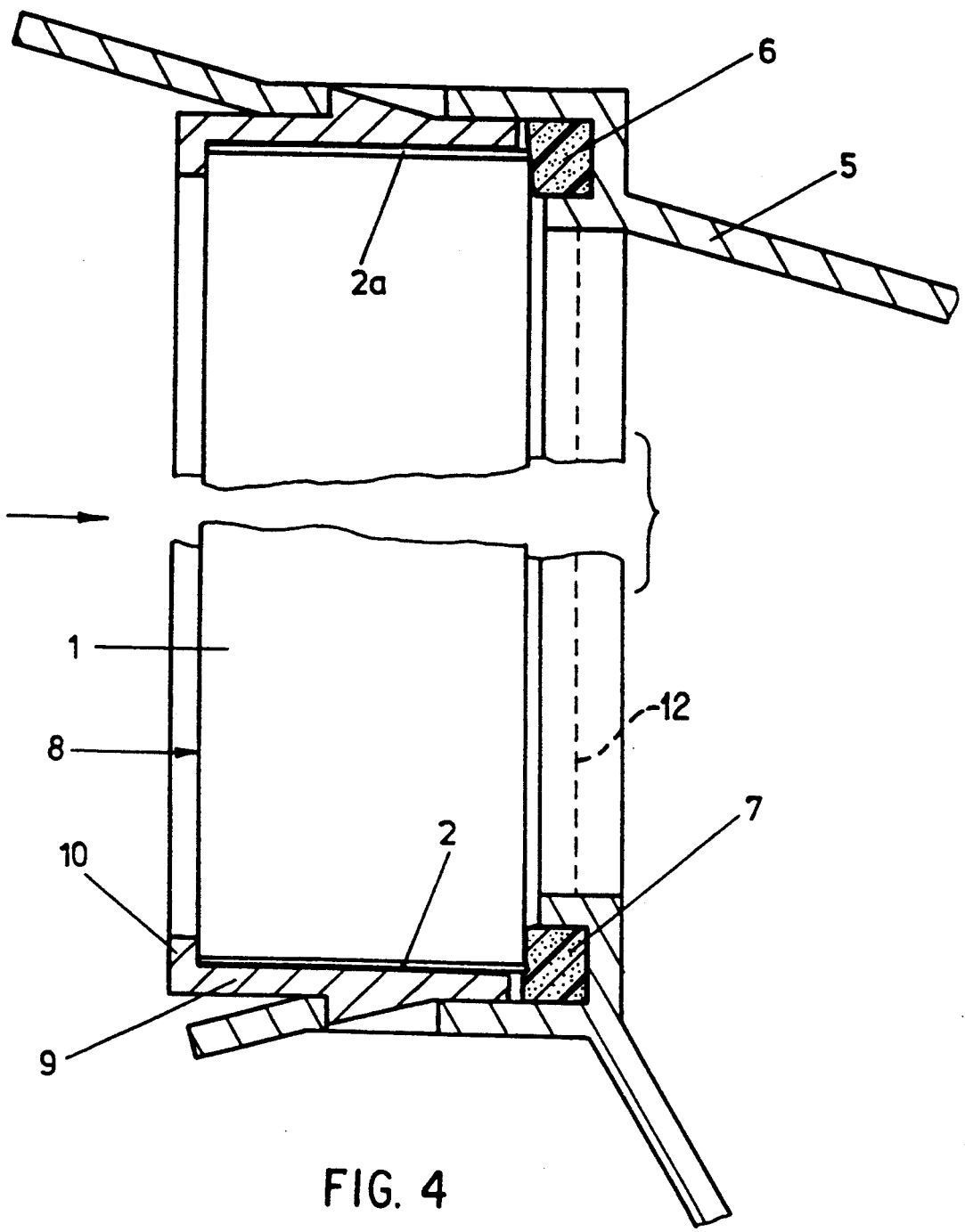
FIG. 4 is a cross sectional view of a filter according to the invention.

FIG. 4 is a partial view of a filter housing 5 with two polyurethane foam seals 6, 7, extending in the longitudinal direction. Furthermore, a filter cassette 8, inserted into the filter housing 5, is shown that comprises the filter medium 1, shown in FIG. 1, and the outer strips 2, 2a. To be recognized is that the outer strips 2, 2a on the clean air side of the filter project slightly beyond the filter medium 1 and can, therefore, be pressed into the seals 6, 7. The contact force necessary for sealing is generated by a clamping frame 9, which is interlocked with the housing 5 and whose one leg 10 sits on the filter cassette 8.

Figure 5:
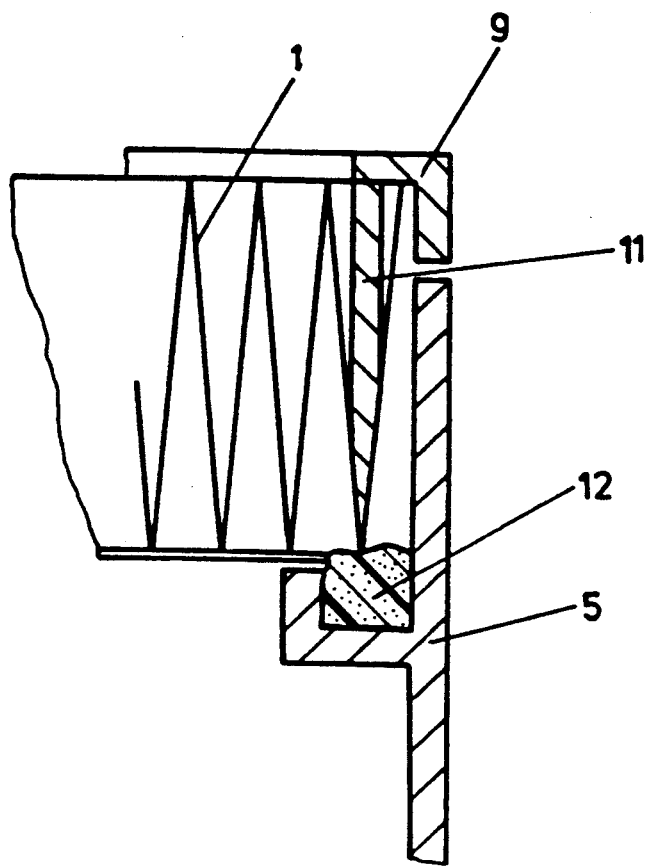
FIG. 5 is a longitudinal view of an outer region of the filter.

FIG. 5 is a sectional view of the outer region of the filter housing 5 on one end of the housing lying in the filter medium's 1 main direction of extension. To be seen is that the clamping frame 9 has there a surface prong 11 which reaches into the outermost fold of the filter medium 1 and presses there the filter medium 1 into a seal 12, which is attached permanently to the housing and which is made of polyurethane foam just like the seals 6 and 7. Even on the side opposite that of the drawing in FIG. 5, the filter medium 1 is held by means of a surface prong, corresponding to the surface prong 11, against a seal, corresponding to the seal 12.

What is claimed is:

1. A filter with a filter cassette adapted to be disposed in a filter housing, comprising a fanfolded filter medium extending in one plane; side members formed by thin walled outer strips cemented against the two staggered faces of the fanfolded filter medium with the downstream side faces of the outer strips protruding slightly beyond the filter medium; and a clamping frame to hold the filter cassette in the filter housing; said clamping frame reaching over the edge of the filter cassette and forcing the protruding downstream side faces of the outer strips into a pair of seals disposed in said housing, and having a surface prong on two opposing sides that reaches into the outermost fanfold of the filter medium and pushes it into another seal disposed in the filter housing.

* * * * *